United States Patent
Conder et al.

(10) Patent No.: US 6,979,025 B2
(45) Date of Patent: Dec. 27, 2005

(54) JOINING OF LINED PIPES

(75) Inventors: Robert John Conder, Inverurie (GB); Zahid Ahmed Shah, Leicestershire (GB)

(73) Assignee: Lattice Intellectual Property Ltd., London (GB)

( * ) Notice: Subject to any disclaimer, the term of this patent is extended or adjusted under 35 U.S.C. 154(b) by 72 days.

(21) Appl. No.: 10/433,479

(22) PCT Filed: Dec. 7, 2001

(86) PCT No.: PCT/GB01/05407

§ 371 (c)(1), (2), (4) Date: Oct. 29, 2003

(87) PCT Pub. No.: WO02/48596

PCT Pub. Date: Jun. 20, 2002

(65) Prior Publication Data

US 2004/0061328 A1  Apr. 1, 2004

(30) Foreign Application Priority Data

Dec. 12, 2000 (GB) .................................. 0030250
Aug. 28, 2001 (GB) .................................. 0120660

(51) Int. Cl.[7] .......................... F16L 55/00; F16L 19/00; F16L 23/00
(52) U.S. Cl. .................. 285/55; 285/364; 285/368; 285/406; 285/412
(58) Field of Search .............................. 285/55, 293.1, 285/363, 364, 368, 406, 412, 45

(56) References Cited

U.S. PATENT DOCUMENTS

| 2,157,357 A | * | 5/1939 | Straty ...................... 138/147 |
| 2,290,333 A | * | 7/1942 | Johnson ...................... 285/55 |
| 2,592,419 A | * | 4/1952 | Harper et al. ............... 220/4.17 |
| 3,189,371 A | * | 6/1965 | Swan ............................ 285/55 |
| 3,702,199 A | * | 11/1972 | Brooks et al. ................ 285/55 |
| 3,921,673 A | * | 11/1975 | Pero ............................ 138/109 |
| 4,281,859 A | | 8/1981 | Davies |
| 4,336,958 A | * | 6/1982 | Goetzinger .................. 285/55 |
| 4,496,499 A | | 1/1985 | Brittain et al. |
| 4,537,425 A | | 8/1985 | Press et al. |
| 4,619,470 A | | 10/1986 | Overath et al. |
| 4,643,457 A | * | 2/1987 | Press ............................ 285/55 |
| 4,691,740 A | | 9/1987 | Svetlik et al. |
| 4,838,477 A | * | 6/1989 | Roach et al. ................ 228/222 |
| 5,127,116 A | | 7/1992 | Greig |

(Continued)

FOREIGN PATENT DOCUMENTS

EP  0 314 970  5/1989

(Continued)

*Primary Examiner*—James M. Hewitt
(74) *Attorney, Agent, or Firm*—Oblon, Spivak, McClelland, Maier & Neustadt, P.C.

(57) ABSTRACT

A metal pipeline section that has a metal flange at one end is lined with a plastic liner such that some of the liner extends beyond the flange end of the pipeline section. An annular plastic member is electrofusion joined onto the outside of the portion of plastic liner which extends beyond the flange end of the pipeline section and any liner extending beyond the annular plastic member is trimmed off to make the liner flush with the annular plastic member. The annular plastic member is then positioned adjacent the annular plastic member of another similarly prepared pipeline section and a containment ring is secured around them to restrain any outward movement of the annular plastic members when the pipeline is in use. The metal flanges are secured to each other such that the annular plastic members are compressed between them to prevent leakage.

13 Claims, 3 Drawing Sheets

U.S. PATENT DOCUMENTS

| | | | |
|---|---|---|---|
| 5,171,041 A * | 12/1992 | McMillan et al. | 285/21.2 |
| 5,236,231 A * | 8/1993 | Allen et al. | 285/55 |
| 5,277,455 A * | 1/1994 | Graves et al. | 285/55 |
| 5,462,706 A | 10/1995 | McMillan et al. | |
| 5,573,282 A * | 11/1996 | Egner et al. | 285/55 |
| 5,876,070 A * | 3/1999 | McNealy et al. | 285/55 |
| 5,947,528 A * | 9/1999 | Campbell | 285/16 |
| 5,988,691 A * | 11/1999 | Cruickshank | 285/55 |
| 6,079,095 A * | 6/2000 | McMillan et al. | 29/509 |
| 6,176,525 B1 * | 1/2001 | McMillan et al. | 285/55 |
| 6,375,229 B1 * | 4/2002 | Astor | 285/55 |
| 6,543,811 B1 * | 4/2003 | Campbell | 285/16 |
| 6,604,761 B1 * | 8/2003 | Debalme et al. | 285/353 |

FOREIGN PATENT DOCUMENTS

WO     WO 95/12086     5/1995

* cited by examiner

JOINING OF LINED PIPES

BACKGROUND OF THE INVENTION

The present invention relates to the joining of lined pipes, particularly lined pipes for high pressure applications.

Steel pipelines conveying certain fluids, such as mining slurries, at high pressures, are subject to high rates of corrosion and wear. For such applications, mining companies often specify flanged joints for routine maintenance or rotation of individual pipe sections to obtain uniform abrasion and wear. Lining the steel pipe with a suitable close-fit plastic liner can considerably reduce corrosion and wear, thereby increasing the operating life of the pipeline. However, a means of connecting sections of lined pipes is required that contains the fluid within the plastic liner, can be dismantled frequently and/or is designed such that it does not cause any internal obstruction in the pipe.

SUMMARY OF THE INVENTION

According to a first aspect of the present invention, there is provided a method for joining plastic lined metal pipeline sections to form a plastic lined metal pipeline for carrying high pressure fluids and slurries, the method comprising:

lining a metal pipeline section that has a metal flange at one end with a plastic liner such that some of the liner extends beyond the flange end of the pipeline section;

electrofusion joining an annular plastic member onto the outside of the portion of the liner which extends beyond the flange end of the metal pipeline section;

if the liner extends beyond the annular plastic member, trimming the liner to be substantially flush with the annular plastic member, performing the above steps on another pipeline section that has a metal flange at one end;

positioning the plastic members of both lined pipeline sections substantially adjacent to each other and substantially in axial alignment with each other;

securing a containment ring around both annular plastic members to restrain any outward movement of the plastic members when in use; and securing the annular metal flanges to each other such that the annular plastic members are compressed between the metal flanges.

The annular plastic members are compressed sufficiently to prevent leakage. The annular metal flanges are preferably secured to each other by a series of nuts and bolts passing through appropriate apertures arranged circumferentially around the metal flanges, but any method of securing the metal flanges to each other will be satisfactory.

Such a method joins two lined pipe sections together substantially reducing the risk of leakage from the joined pipe sections, even when the pipe sections are conveying high pressure fluid or slurry. If necessary the joined pipeline sections can be released from each other.

According to a second aspect of the present invention, there is provided a connector for connecting two plastic lined metal pipeline sections to form a connection for pipelines able to convey high pressure fluids with no or negligible leakage, the connector comprising:

two annular plastic members, each one being arranged to be electrofusion joined onto the outside surface of a portion of plastic liner extending out from an end of a metal pipeline section provided with a flange;

a containment ring arranged to be secured around both annular plastic members when they are arranged substantially adjacent to each other and substantially in axial alignment with each other, if necessary after trimming the liners to be substantially flush with the annular plastic members, the containment ring being provided to restrain any outward movement of the plastic members when in use; and means to secure the annular metal flanges to each other such that the annular plastic members are compressed between the metal flanges.

According to a third aspect of the present invention, there is provided a pipeline formed using the method of the first aspect of the present invention.

BRIEF DESCRIPTION OF THE DRAWINGS

An example of the present invention is described below with reference to the accompanying drawings in which.

DETAILED DESCRIPTION OF THE PREFERRED EMBODIMENTS

Figure 1:
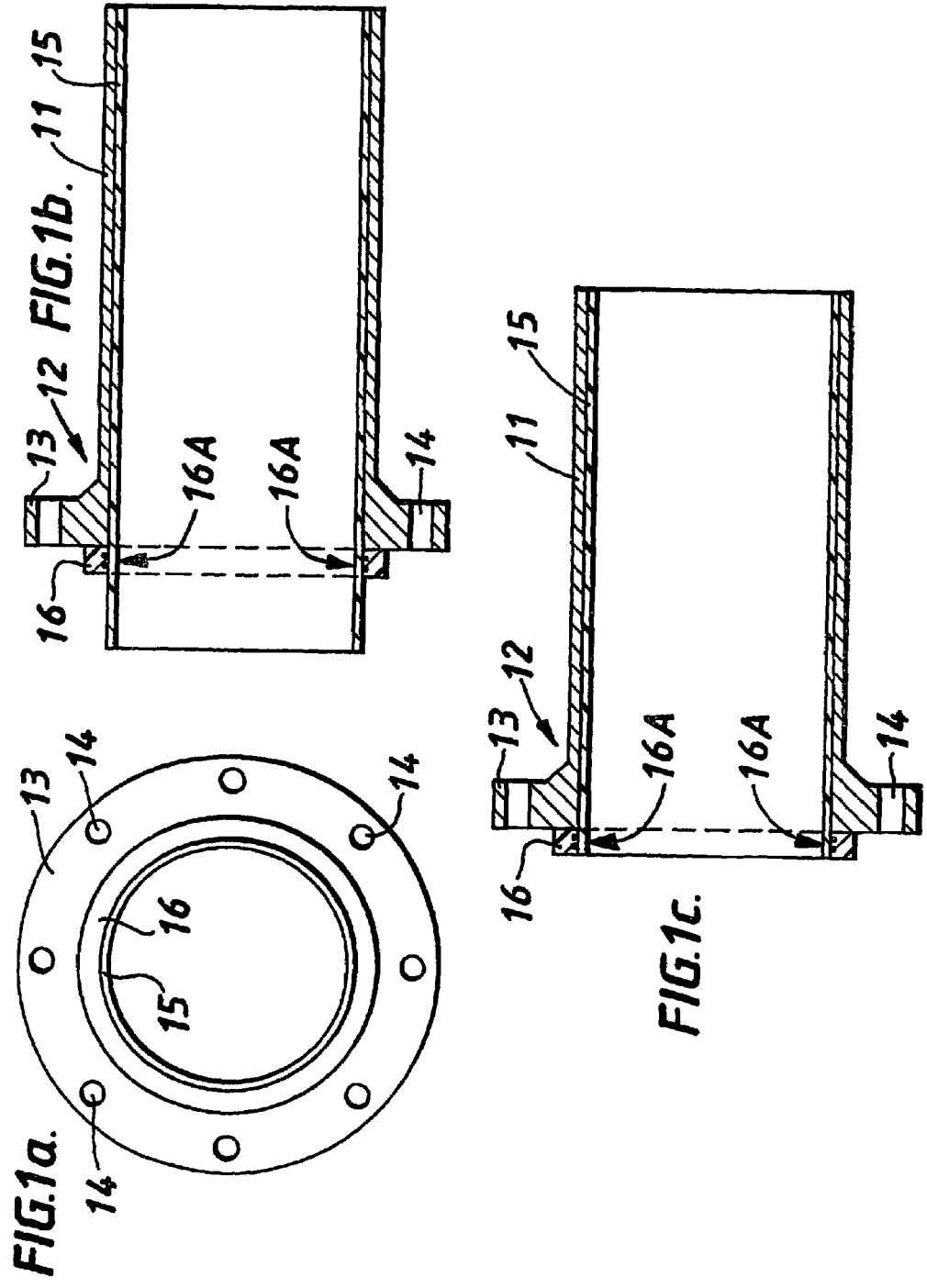
FIGS. 1a, 1b and 1c show an end view and cross-sectional side views of a pipeline section before and after having its liner trimmed.

As shown in FIG. 1, a metal pipeline section 11, in this case made from steel, has an annular metal flange 13 at one end. The pipeline section 11 could be provided with a flange 13 by any suitable means, such as by welding the flange onto the pipe or by providing a pipe with a flange already fitted for example. As seen in the end view of the flange 13 in FIG. 1a, bolt holes 14 are arranged circumferentially around the metal flange 13. The steel pipeline section 11 is then lined with a plastic liner 15 such that a portion of the plastic liner 15 extends beyond the end portion 12 of metal pipeline section 11 as shown in FIG. 1b. The portion of plastic liner 15 that extends beyond the end portion 12 of the metal pipeline section 11 then has an annular plastic member 16 mounted on its exposed outside surface adjacent to the flange 13. In this example, the annular plastic member 16 is made from polyethylene. The annular plastic member 16 has electrofusion coils 16A to melt the surrounding plastic in the member 16 and in the plastic liner 15 to join the plastic member 16 to the plastic liner 15. If the liner 15 extends beyond the annular plastic member 16, the protruding liner 15 is trimmed to be substantially flush with the annular plastic member 16 as shown in FIG. 1c.

Figure 2:
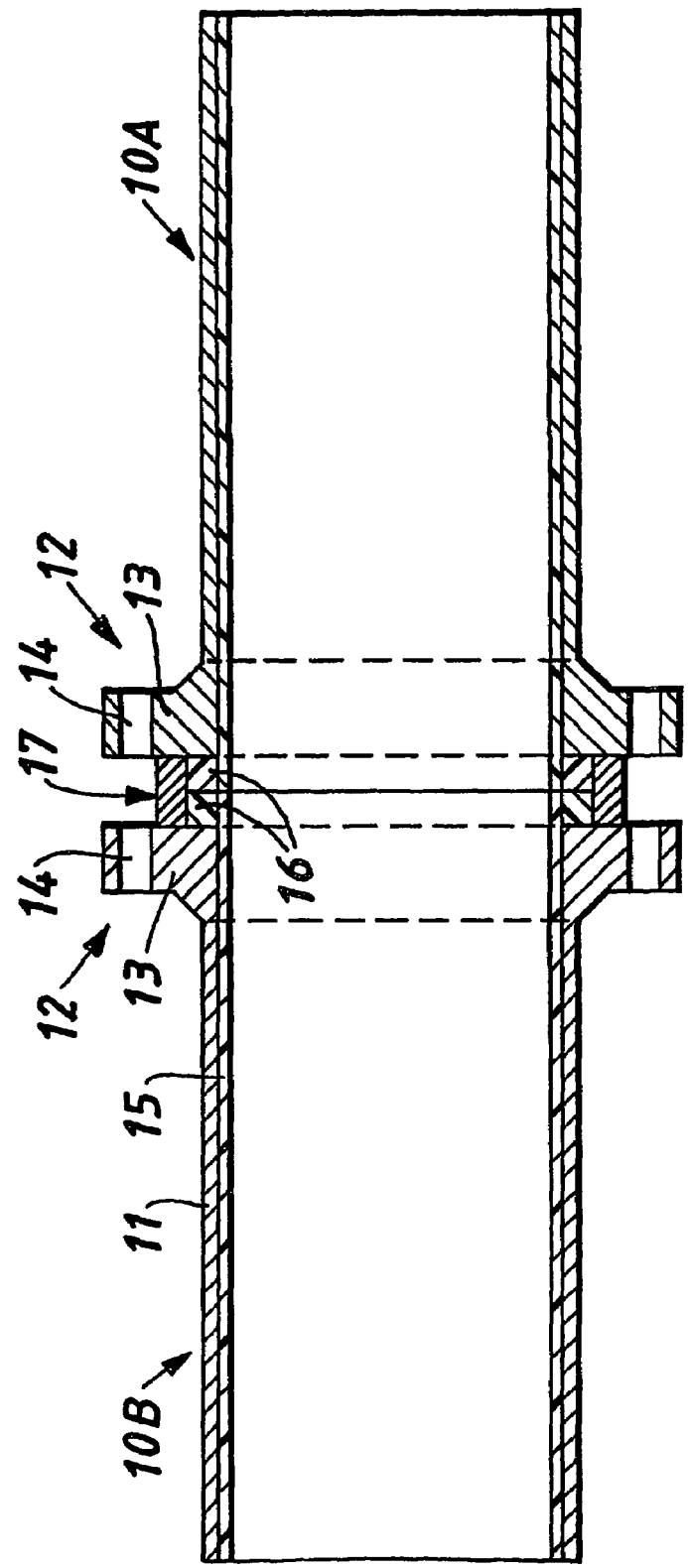
FIG. 2 shows two pipeline sections of the form shown in FIG. 1 arranged adjacent to each other and in axial alignment with each other.

FIG. 2 shows the end portions 12 of two plastic lined pipeline sections 10A, 10B arranged with their ends adjacent to each other and in axial alignment A metal ring 17 is secured around the two annular plastic members 16. The metal ring could be provided in a single piece or a number of pieces such as a split ring. The metal ring in this example is fitted by first being slipped around the plastic member 16 on one separate pipe 10A, and then bringing the plastic member 16 fitted to the second pipe 101 adjacent to the plastic member of the first pipe 10A by slipping it under the metal ring 17 already fitted around the first pipe 10A.

Figure 3:
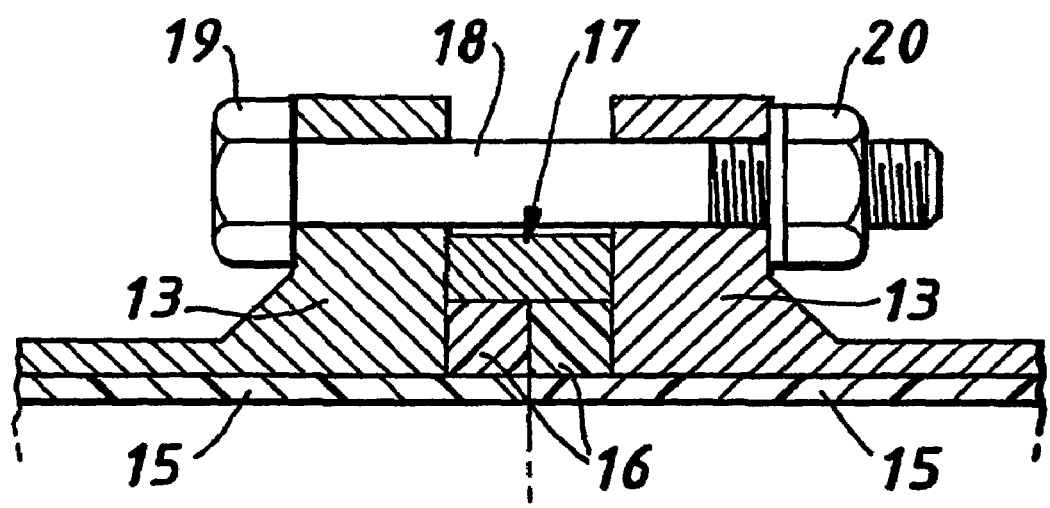
FIG. 3 shows a joint formed by two pipeline sections.

FIG. 3 shows the cross-sectional joint between the first and second pipe sections 10A, 10B in more detail. The two flanges 13 are held together by a screw threaded bolt 18 which passes through bolt holes 14. The bolt 18 is provided with a head 19 at one end and when passed through appropriate axially aligned bolt holes 14 has a nut 20 threaded onto it at the other end to secure the two flanges 13 together. Similar nuts and bolts are secured to an appropriate number of axially aligned pairs of bolt holes arranged circumferentially around the adjacent pipes 10A, 10B.

The nut 20 is tightened onto the screw threaded bolt 19 to pull the metal flanges 13 closer together which also compresses plastic members 16 sufficiently to provide a suitable seal. The width of containment ring 17 is set such that the plastic members 16 are compressed to an optimum level. By compressing the plastic flanges, a sufficiently strong seal is provided for the joint to be used to join pipe sections carrying high pressure gases, fluids or slurries with no or negligible leakage. The degree of compression required will depend upon the pressure of fluid to be conveyed. Such a joint can advantageously be undone or released by unscrewing the nuts and bolts to enable routine maintenance or rotation of pipe sections to be performed.

The above example is illustrative and should not be taken to be limiting upon the scope of the invention. For example, neighbouring axially aligned metal flanges 13 need not be secured to each other with nuts and bolts but could be secured to each other with any appropriate securing means. Furthermore, the annular plastic members 16 need not be made from polyethylene. Any suitable compressible material will suffice.

What is claimed is:

1. A method for joining plastic lined metal pipeline sections to form a plastic lined metal pipeline for carrying high pressure fluids and slurries, the method comprising:
   lining a metal pipeline section that has a metal flange at one end with a plastic liner such that some of the liner extends beyond the flange end of the pipeline section;
   electrofusion joining an annular plastic member onto the outside of the portion of plastic liner which extends beyond the flange end of the metal pipeline section;
   if the liner extends beyond the annular plastic member, trimming the liner to be substantially flush with the annular plastic member,
   performing the above steps on another pipeline section that has a metal flange at one end;
   positioning the plastic members of both lined pipeline sections substantially adjacent to each other and substantially in axial alignment with each other;
   securing a containment ring around both annular plastic members to restrain any outward movement of the plastic members when in use; and
   securing the annular metal flanges to each other such that the annular plastic members are compressed between the metal flanges.

2. A method according to claim 1, wherein the annular plastic members are compressed between the metal flanges until both metal flanges are brought into contact with the containment ring and the width of the containment ring is set such that when both metal flanges are in contact with the ring, the plastic members are compressed an amount sufficient to provide a fluid seal therebetween.

3. A method according to claim 1, wherein the containment ring is a split ring.

4. A method according to claim 1, wherein the containment ring is provided in a single piece.

5. A connector for connecting two plastic lined metal pipeline sections to form a connection for pipelines able to convey high pressure fluids with no or negligible leakage, the connector comprising:
   two annular plastic members, each one being arranged to be electrofusion joined onto the outside surface of a portion of plastic liner extending out from an end of a metal pipeline section provided with a flange;
   a containment ring arranged to be secured around both annular plastic members when they are arranged substantially adjacent to each other and substantially in axial alignment with each other, if necessary after trimming the liners to be substantially flush with the annular plastic members, the containment ring being provided to restrain any outward movement of the plastic members when in use; and
   means to secure the flanges to each other such that the annular plastic members are compressed between the flanges.

6. A connector according to claim 5, wherein the width of the containment ring is set such that the securing of the flanges to each other brings them into contact with the containment ring and compresses the annular plastic members an amount sufficient to provide a fluid seal therebetween.

7. A connector according to claim 5, wherein the containment ring is a split ring.

8. A connector according to claim 5, wherein the containment ring is provided in a single piece.

9. A high pressure pipeline comprising two substantially adjacent, substantially axially aligned metal pipeline sections joined to each other by the method of claim 1.

10. A method according to claim 2, wherein the containment ring is a split ring.

11. A method according to claim 2, wherein the containment ring is provided in a single piece.

12. A connector according to claim 6, wherein the containment ring is a split ring.

13. A connector according to claim 6, wherein the containment ring is provided in a single piece.

* * * * *